(12) United States Patent
Chaudoin et al.

(10) Patent No.: US 7,195,262 B2
(45) Date of Patent: Mar. 27, 2007

(54) HITCH-MOUNTED STEP FOR A VEHICLE AND METHOD THEREFOR

(76) Inventors: Jimmy Chaudoin, 6133 E. Clinton St., Scottsdale, AZ (US) 85254; Nancy Chaudoin, 6133 E. Clinton St., Scottsdale, AZ (US) 85254

( * ) Notice: Subject to any disclaimer, the term of this patent is extended or adjusted under 35 U.S.C. 154(b) by 259 days.

(21) Appl. No.: 10/864,015

(22) Filed: Jun. 9, 2004

(65) Prior Publication Data
US 2005/0275187 A1 Dec. 15, 2005

(51) Int. Cl.
*B60R 3/00* (2006.01)
(52) U.S. Cl. .................. 280/166; 280/163; 280/164.1; 280/169
(58) Field of Classification Search ................ 280/166, 280/163, 164.1, 169
See application file for complete search history.

(56) References Cited

U.S. PATENT DOCUMENTS

| | | | |
|---|---|---|---|
| 3,716,254 A * | 2/1973 | Tarvin ....................... 280/166 |
| 4,194,754 A | 3/1980 | Hightower | |
| 5,738,362 A | 4/1998 | Ludwick | |
| 5,803,475 A * | 9/1998 | Dick ........................ 280/163 |
| 6,042,135 A * | 3/2000 | Ross ...................... 280/456.1 |
| 6,145,865 A | 11/2000 | Cannara et al. | |
| 6,170,842 B1 * | 1/2001 | Mueller .................... 280/163 |
| 6,511,086 B2 | 1/2003 | Schlicht | |
| 6,511,088 B2 * | 1/2003 | Kahlstorf ................ 280/415.1 |
| 6,530,588 B1 | 3/2003 | Varney et al. | |
| 6,659,224 B2 * | 12/2003 | Medsker .................... 182/91 |
| 6,659,484 B2 | 12/2003 | Knodle et al. | |
| 6,682,086 B1 | 1/2004 | Erickson | |
| 6,685,204 B1 | 2/2004 | Hehr | |
| 6,742,799 B1 * | 6/2004 | Hansen ..................... 280/495 |
| 6,874,806 B1 * | 4/2005 | Blake ....................... 280/507 |
| 6,908,096 B2 * | 6/2005 | Lewis et al. ............... 280/507 |
| 6,994,362 B2 * | 2/2006 | Foster ....................... 280/163 |
| 2001/0035625 A1 | 11/2001 | Debo | |
| 2003/0094472 A1 | 5/2003 | Knodle et al. | |
| 2003/0116938 A1 | 6/2003 | Shields et al. | |

* cited by examiner

*Primary Examiner*—Christopher P. Ellis
*Assistant Examiner*—Cynthia F. Collado
(74) *Attorney, Agent, or Firm*—Craig Weiss; Harry M. Weiss; Weiss & Moy, P.C.

(57) ABSTRACT

A hitch-mounted step for a vehicle that extends beyond a deployed fold-down tailgate of a vehicle and allows people and pets to more easily enter and exit the rear cargo area of a vehicle. The hitch-mounted step is easily stored and deployed without the need to remove the step from the receiver hitch.

18 Claims, 2 Drawing Sheets

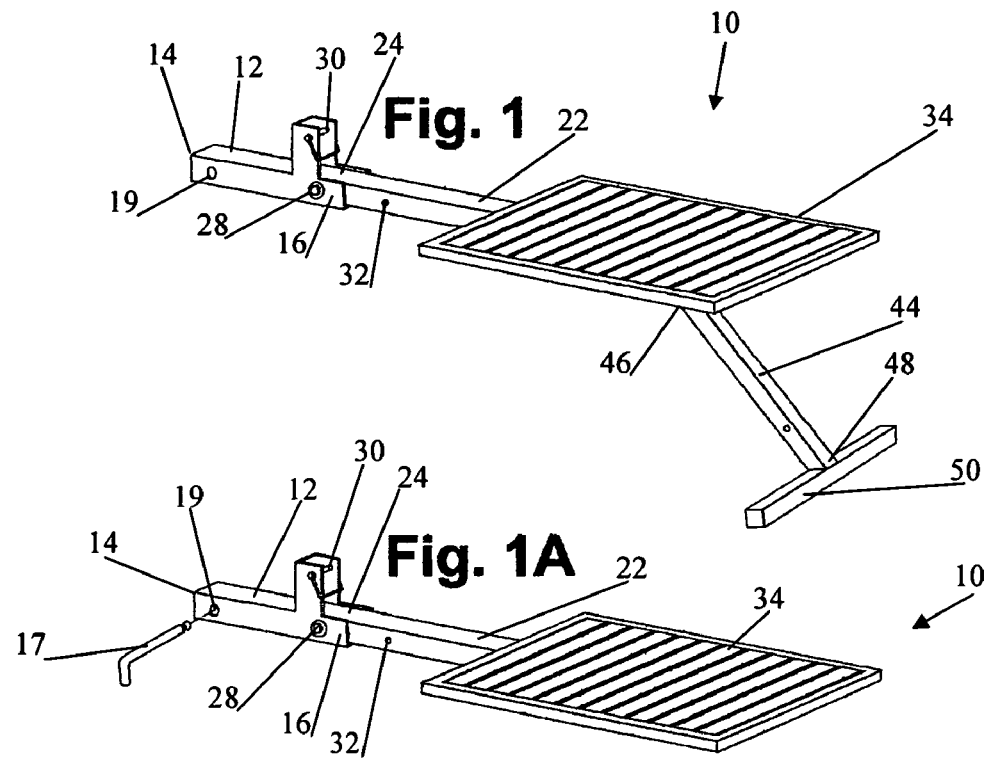
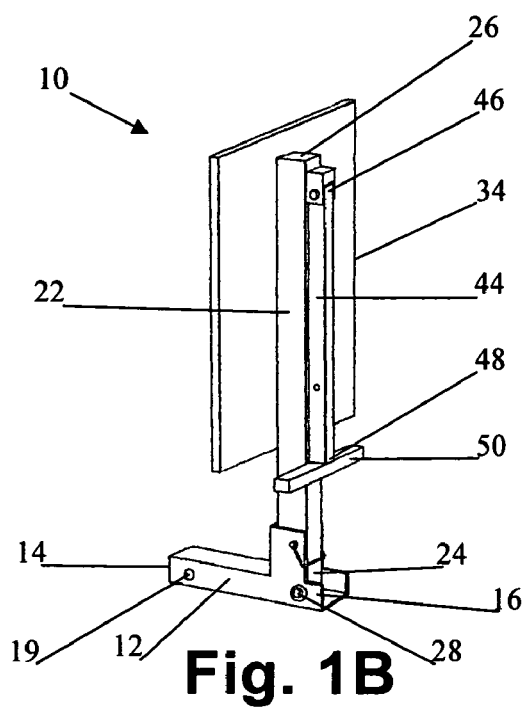
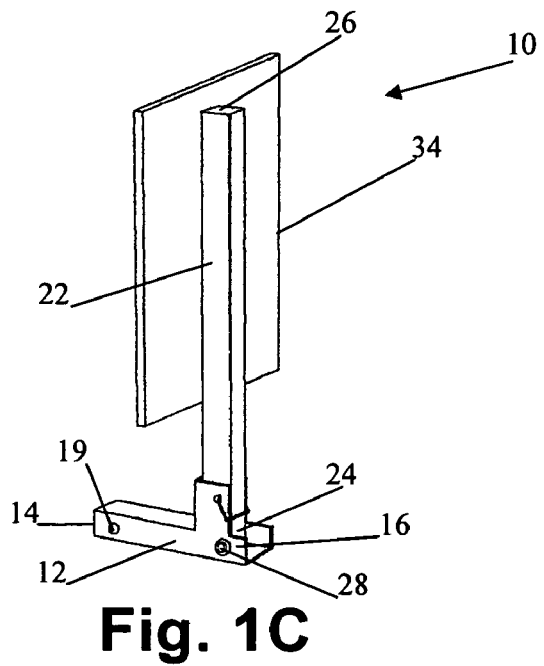

HITCH-MOUNTED STEP FOR A VEHICLE AND METHOD THEREFOR

FIELD OF THE INVENTION

This invention relates generally to vehicle accessories and, more specifically, to a hitch-mounted step attachable to a vehicle hitch assembly and capable of providing easier access to a rear storage area of a vehicle.

BACKGROUND OF THE INVENTION

Pick-up trucks and sport utility vehicles (SUVs) have grown substantially in popularity in recent years. One of the reasons for the rise in consumer interest in these types of vehicles is due to their increased cargo space and storage capacity. Typically, these vehicles have a tailgate at the rear of the vehicle which opens to provide a user with access to the rear cargo area of the vehicle. Pick-up trucks and SUVs in particular tend to have a relatively high ground clearance as compared to standard sized vehicles. As a result, it can often be difficult for an individual or pet to enter, exit or otherwise gain access to the rear cargo area of such a vehicle. Especially in the case of pick-up trucks and SUVs having a fold-down tailgate, entry and access to the rear cargo area of the vehicle is difficult.

Various attempts have been made to address this problem by providing a platform mountable to the rear of a vehicle. Several patents disclose steps that are coupled to the bumper, as opposed to the receiver hitch. For example, U.S. Pat. No. 3,716,254 issued to Tarvin, U.S. Pat. No. 4,194,754 issued to Hightower and U.S. Pat. No. 6,530,588 B1 issued to Varney et al. show steps that are mounted to the bumper of a vehicle. These devices require installation that is time consuming and require drilling holes and/or inserting pins through the bumper of a vehicle.

Other patents show step assemblies that are stored beneath the bumper of a vehicle. For example, U.S. Pat. No. 6,659,484 B2 issued to Knodle et al. and U.S. Pat. No. 5,738,362 issued to Ludwick show hitch-mounted steps that can be rotated beneath the bumper for storage and rotated out for use. Objects stored beneath the bumper of a vehicle are much more likely to be damaged by coming into contact with the ground or debris. For this reason many spare tires, which were once stored beneath the vehicle have been moved inside vehicles or are mounted on vehicle tailgates to avoid this problem. In addition, a flat tire or uneven ground surface may make objects such as the Knodle and Ludwick steps, which are stored beneath the vehicle, inaccessible. Similarly, U.S. Pat. No. 5,803,475 issued to Dick discloses a multiple step attachment for a vehicle that, in the stored position, rests slightly below the bumper of the vehicle. In addition, the cumbersome design of the Dick multi-step invention requires deploying and storing the device in stages with the need to fold the steps up and down multiple times.

Several patents and patent applications disclose hitch-mounted steps that must be removed when not in use. For example, U.S. Pat. No. 6,682,086 B1 issued to Erickson, U.S. Pat. No. 6,685,204 B1 issued to Hehr, U.S. Patent Application Publication No. US 2001/0035625 A1 filed by Debo and U.S. Patent Application Publication No. US 2003/0116938 A1 filed by Shields et al. disclose hitch-mounted steps that are fixedly coupled to the rear of the vehicle, thus necessitating their removal when not in use.

Several patents disclose steps that do not extend beyond a deployed tailgate of a vehicle. For example, U.S. Pat. No. 6,511,086 B2 issued to Schlicht and U.S. Pat. No. 6,145,865 issued to Cannara et al. show steps that while, mounted to the vehicle hitch of a vehicle, do not extend sufficiently horizontally from the rear of the vehicle to be useful when a drop-down tailgate is lowered.

Therefore a need existed for a hitch-mounted step for a vehicle capable of being easily stored and deployed without the need to remove the step from the receiver hitch while at the same time being capable of extending beyond a deployed fold-down tailgate of a vehicle.

SUMMARY OF THE INVENTION

It is an object of the present invention to provide a hitch-mounted step for a vehicle capable of assisting humans and animals to enter and exit a rear cargo area of a vehicle.

It is a further object of the present invention to provide a hitch-mounted step for a vehicle that can be stored without substantially blocking the rear license plate area of a vehicle.

It is a still further object of the present invention to provide a hitch-mounted step for a vehicle in which the step extends substantially entirely beyond a deployed drop-down tailgate of a vehicle.

It is yet another object of the present invention to provide a method for accessing a rear cargo area of a vehicle by a human or an animal.

BRIEF DESCRIPTION OF THE PREFERRED EMBODIMENTS

In accordance with one embodiment of the present invention, a hitch-mounted step for a vehicle is disclosed, comprising, in combination, a coupling arm having a receiver mounting end and a support arm coupling end, the receiver mounting end dimensioned to be inserted into a hitch receiver of a vehicle, a support arm having a first end and a second end, the first end of the support arm rotatably coupled to the support arm coupling end of the coupling arm so that the support arm being capable of rotating substantially vertically from the support arm coupling end of the coupling arm, and a step support platform coupled to the support arm, the step support platform dimensioned to substantially entirely extend beyond a deployed tailgate of a vehicle when the support arm being in a substantially horizontal position.

In accordance with another embodiment of the present invention, a method for accessing a rear cargo area of a vehicle is disclosed, comprising, in combination, the steps of providing a coupling arm having a receiver mounting end and a support arm coupling end, inserting the receiver mounting end into a hitch receiver of a vehicle, providing a support arm having a first end and a second end, the first end of the support arm rotatably coupled to the support arm coupling end of the coupling arm so that the support arm being capable of rotating substantially vertically from the support arm coupling end of the coupling arm, providing a step support platform coupled to the support arm, and deploying the step support platform by extending the support arm to a position substantially parallel to a ground surface so that the step support platform extends substantially entirely beyond a deployed tailgate of a vehicle.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view of one embodiment of the hitch-mounted step for a vehicle of the present invention, showing the stabilizing leg deployed beneath the step support platform.

FIG. 1A is a perspective view of another embodiment of the hitch-mounted step for a vehicle of the present invention, which lacks a stabilizing leg.

FIG. 1B is perspective view of the hitch-mounted step for a vehicle of FIG. 1, showing the hitch-mounted step in a stored position.

FIG. 1C is perspective view of the hitch-mounted step for a vehicle of FIG. 1A, showing the hitch-mounted step in a stored position.

DETAILED DESCRIPTION OF THE PREFERRED EMBODIMENTS

Figure 2:
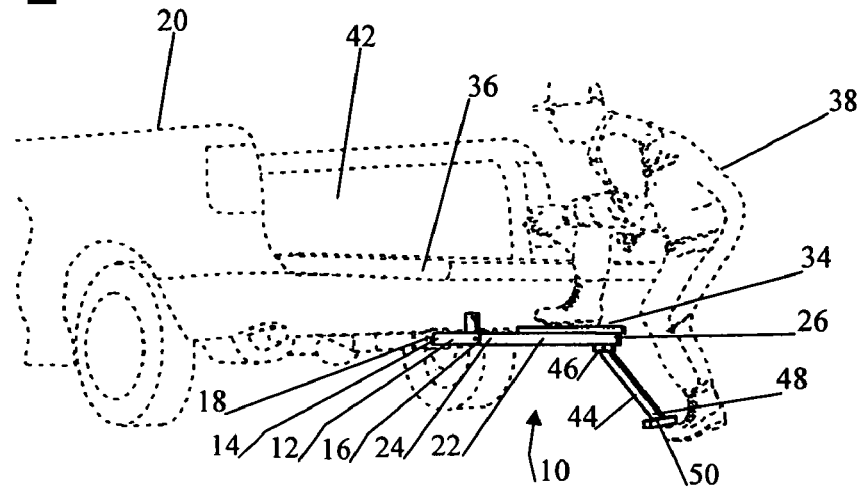
FIG. 2 is a perspective view of the hitch-mounted step of FIG. 1 coupled to a vehicle with a tailgate.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

Figure 2A:
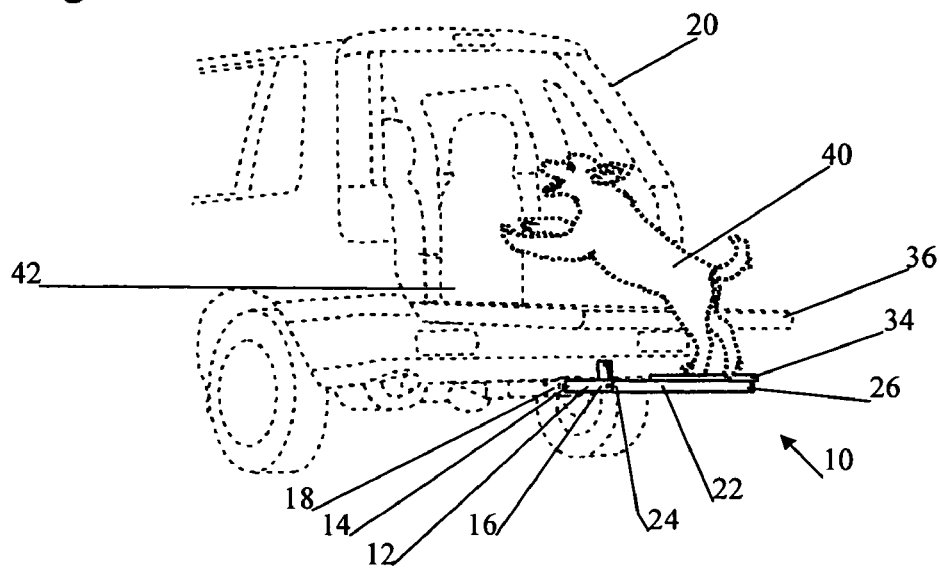
FIG. 2A is a perspective view of the hitch-mounted step of FIG. 1A coupled to a vehicle with a hatchback.
Figure 2B:
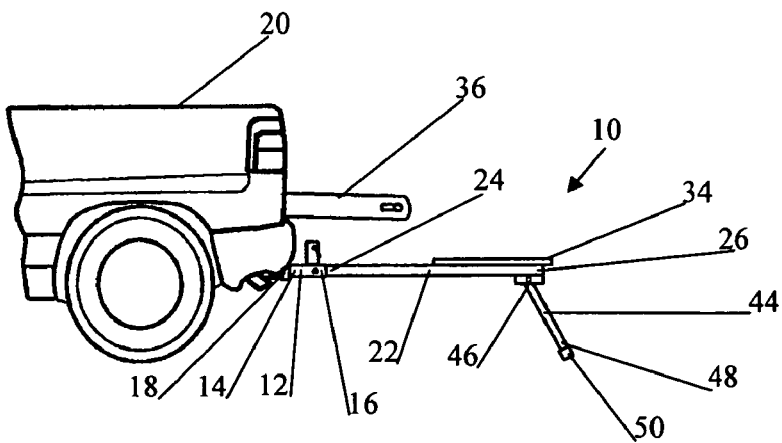
FIG. 2B is a side view of the hitch-mounted step of FIG. 1, showing the step support platform extending substantially entirely beyond a deployed tailgate of the vehicle.

Referring to FIGS. 1–2B, a hitch-mounted step for a vehicle, hereinafter hitch-mounted step 10, is disclosed. The hitch-mounted step 10 comprises a coupling arm 12 having a receiver mounting end 14 and a support arm coupling end 16. The receiver mounting end 14 is dimensioned to be inserted into a hitch receiver 18 (shown in FIGS. 2, 2A and 2B) of a vehicle 20 (shown in FIGS. 2, 2A and 2B). Preferably, a first locking pin 17 (shown in FIG. 1A) is inserted into a corresponding aperture 19 (shown in FIGS. 1–1C) defined by the receiver mounting end 14 of the coupling arm 12 and through the hitch receiver 18 in order to secure the coupling arm 12 to the hitch receiver 18. While, in the preferred embodiment, a first locking pin 17 is used to secure the coupling arm 12 to the hitch receiver 18 it should be clearly understood that substantial benefit could be derived from an alternative embodiment of the present invention in which no locking pin is used or in which an alternative coupling mechanism is used, so long as the coupling arm 12 is securely coupled to the receiver hitch 18.

In the preferred embodiment, the support arm coupling end 16 of the coupling arm 12 is substantially L-shaped with the support arm coupling end 16 of the coupling arm extending vertically approximately 4 inches from the coupling arm 12, although it should be clearly understood that substantial benefit could be derived from an alternative configuration of the present invention in which the support arm coupling end 16 of the coupling arm 12 is not substantially L-shaped. In the preferred embodiment, the coupling arm 12 has a length of approximately 15 inches from the receiver mounting end 14 to the support arm coupling end 16, a width of approximately 2 inches and a height of approximately 2 inches, although it should be clearly understood that substantial benefit could be derived from an alternative configuration of the hitch-mounted step 10 of the present invention in which the coupling arm 12 has a length, width and height that deviate, even substantially, from the preferred dimensions in either direction.

The hitch-mounted step 10 of the present invention further comprises a support arm 22 having a first end 24 and a second end 26 (shown in FIGS. 1B–2B). The first end 24 of the support arm 22 is rotatably coupled to the support arm coupling end 16 of the coupling arm 12 so that the support arm 22 is capable of rotating substantially vertically from the support arm coupling end 16 of the coupling arm 12. In this way, the support arm 22 can be deployed in a substantially horizontal position and stored in a substantially vertical position relative to a ground surface. In the preferred embodiment, the support arm 22 has a length of approximately 33 inches from the first end 24 of the support arm 22 to the second end 26 of the support arm 22, a width of approximately 1½ inch and a height of approximately 2 inches, although it should be clearly understood that substantial benefit could be derived from an alternative configuration of the hitch-mounted step 10 of the present invention in which the support arm 22 has a length, width and height that deviate, even substantially, from the preferred dimensions in either direction.

Referring now to FIGS. 1–1C, preferably a bolt 28 secures the first end 24 of the support arm 22 to the support arm coupling end 16 of the coupling arm 12, thus allowing the rotation of the support arm 22 about the bolt 28. Further preferably, a second locking pin 30 (shown in FIGS. 1 and 1A) is dimensioned to be inserted into a corresponding aperture 32 (shown in FIGS. 1 and 1A) defined by the support arm 22 in order to lock the support arm 22 into a vertical position when stored (as shown in FIGS. 1B and 1C). While, in the preferred embodiment a second locking pin 30 is used to secure the support arm 22 in a stored, vertical position, it should be clearly understood that substantial benefit could be derived from an alternative configuration of the present invention in which no locking pin is used, or in which some other type of coupling mechanism, such as a bracket, is used, so long as the support arm 22 is capable of being securely stored when not in use.

Referring now to FIGS. 1–2B, the hitch-mounted step 10 of the present invention further comprises a step support platform 34. The step support platform 34 is coupled to the support arm 22 and is dimensioned to extend substantially entirely beyond a deployed tailgate 36 (shown in FIGS. 2–2B) of a vehicle 20 when the support arm 22 is in a substantially horizontal position. The step support platform 34 is dimensioned to allow a person 38 (shown in FIG. 2) or a pet 40 (shown in FIG. 2A) to gain access to the rear cargo area 42 (shown in FIGS. 2–2A) of a vehicle 20. The hitch-mounted step 10 allows a person 38 or pet 40 to enter, exit or simply gain better access to the rear entry of a vehicle 20. It should be clearly understood that it is within the spirit and scope of this invention that the hitch-mounted step 10 be used with a pick-up truck (as shown in FIGS. 2 and 2B), an SUV (as shown in FIG. 2A) or some other type of vehicle. For example, an elderly or handicapped person may desire the use of the hitch-mounted step 10 for a standard sized vehicle. Additionally, it should be understood that although the hitch-mounted step 10 is shown with vehicles having a drop-down tailgate 36, substantial benefit could be derived from using the hitch-mounted step 10 with a vehicle, such as certain types of SUVs, which does not have a drop-down tailgate 36.

In the preferred embodiment, the step support platform 34 has a length of approximately 20 inches, a width of approximately 15 inches and is coupled to the support arm 22 beginning approximately 13 inches from the first end 24 of the support arm 22 and extending towards the second end 26 of the support arm 22 (in order to prevent a license plate from being blocked from view by the step support platform 34 when the hitch-mounted step 10 is in a stored position), although it should be clearly understood that substantial benefit could be derived from an alternative configuration of the hitch-mounted step 10 of the present invention in which the step support platform 34 has a length, width and a coupling point that deviate, even substantially, from the preferred dimensions in either direction. Preferably, the coupling arm 12, the support arm 22 and the step support platform 34 are comprised of aluminum, although it should be clearly understood that substantial benefit could be derived from the use of an alternative material, such as steel, a composite, or some other material, so long as the hitch-mounted step 10 can securely support a person 38 or a pet 40. For example, it may be beneficial to provide a smaller version of the hitch-mounted step 10 for pets 40 (with smaller dimensions and perhaps made of a lighter material) and a larger version of the hitch-mounted step 10 for people 38.

Referring now to FIGS. 1, 1B, 2, and 2B, preferably the hitch-mounted step 10 of the present invention further comprises a stabilizing leg 44 having a first end 46 and a second end 48. The first end 46 of the stabilizing leg 44 is coupled, preferably rotatably, to the support arm 22. The second end 48 of the stabilizing leg 44 is dimensioned to contact a ground surface and provide additional support to the step support platform 34 of the hitch-mounted step 10 when the support arm 22 is in a substantially horizontal position. In the preferred embodiment, the stabilizing leg 44 has a length of approximately 17 inches, a width of approximately 1 inch and a height of approximately 1 inch, although it should be clearly understood that substantial benefit could be derived from an alternative configuration of the hitch-mounted step 10 of the present invention in which the stabilizing leg 44 has a length, width and height that deviate, even substantially, from the preferred dimensions in either direction. Preferably, the stabilizing leg 44 is dimensioned to contact a ground surface at a greater horizontal distance from the deployed tailgate 36 than a horizontal distance from the deployed tailgate to the second end 26 of the support arm 22 (as shown in FIGS. 1, 2 and 2B) in order to provide additional stability. Further preferably, the stabilizing leg 44 comprises a crossbar 50 (shown in FIGS. 1, 1B, 2 and 2B) coupled to the second end 48 of the stabilizing leg 44. In the preferred embodiment, the crossbar 50 has a length of approximately 10 inches, a width of approximately 1 inch and a height of approximately 1 inch, although it should be clearly understood that substantial benefit could be derived from an alternative configuration of the hitch-mounted step 10 of the present invention in which the crossbar 50 has a length, width and height that deviate, even substantially, from the preferred dimensions in either direction. The purpose of the stabilizing leg 44 (and the crossbar 50) is to provide additional support to the step support platform 34, although it should be clearly understood that substantial benefit could be derived from an alternative configuration of the hitch-mounted step 10 of the present invention in which there is no crossbar 50 or no stabilizing leg 44, or in which the stabilizing leg 44 is dimensioned to extend only to substantially 90 degrees from the support arm 22.

STATEMENT OF OPERATION

In order to install the hitch-mounted step 10 of the present invention, one must insert the receiver mounting end 14 of the coupling arm 12 into a hitch receiver 18 of a vehicle 20. Preferably, a first locking pin 17 is inserted through an aperture 19 defined by the receiver mounting end 14 of the coupling arm 12 in order to lock the coupling arm 12 to the hitch receiver 18. To deploy the step support platform 34, one must first preferably remove a second locking pin 30 that is inserted through the support arm coupling end 16 of the coupling arm 12 and through the support arm 22 to hold the support arm 22 in a stored, vertical position. Once the second locking pin 30 is removed, the support arm 22 is lowered to a substantially horizontal position, bringing the step support platform 34 also to a substantially horizontal position. In one embodiment of the present invention, the hitch-mounted step 10 is ready for use. If a stabilizing leg 44 is used, then that would also be deployed from the support arm 22 to come into contact with a ground surface.

While the invention has been particularly shown and described with reference to preferred embodiments thereof, it will be understood by those skilled in the art that the foregoing and other changes in form and details may be made therein without departing from the spirit and scope of the invention.

We claim:

1. A hitch-mounted step for a vehicle comprising, in combination:
   a coupling arm having a receiver mounting end and a support arm coupling end, said receiver mounting end dimensioned to be inserted into a hitch receiver of a vehicle;
   a support arm having a first end and a second end, said first end of said support arm rotatably coupled to said support arm coupling end of said coupling arm so that said support arm being capable of rotating substantially vertically from said support arm coupling end of said coupling arm;
   a step support platform coupled to said support arm, said step support platform dimensioned to substantially entirely extend beyond a deployed tailgate of a vehicle when said support arm being in a substantially horizontal position; and
   a stabilizing leg having a first end and a second end, said first end coupled to said support arm and said second end dimensioned to contact a ground surface when said support arm being in a substantially horizontal position.

2. The hitch-mounted step of claim 1 wherein said second end of said stabilizing leg being dimensioned to contact a ground surface at a greater horizontal distance from said deployed tailgate than a horizontal distance from said deployed tailgate to said second end of said support arm.

3. The hitch-mounted step of claim 2 wherein said stabilizing leg having a length of approximately 17 inches and a width of approximately 1 inch and a height of approximately 1 inch.

4. The hitch-mounted step of claim 1 further comprising a crossbar coupled to said second end of said stabilizing leg.

5. The hitch-mounted step of claim 4 wherein said crossbar having a width of approximately 1 inch, a height of approximately 1 inch and a length of approximately 10 inches.

6. The hitch-mounted step of claim 1 wherein said first end of said stabilizing leg being coupled to a bottom surface of said support arm proximate said second end of said support arm.

7. The hitch-mounted step of claim 1 wherein said coupling arm having a length of approximately 15 inches from said receiver mounting end to said support arm coupling end.

8. The hitch-mounted step of claim 1 wherein said support arm having a length of approximately 33 inches from said first end of said support arm to said second end of said support arm.

9. The hitch-mounted step of claim 8 wherein said step support platform being coupled to said support arm beginning approximately 13 inches from said first end of said support arm and extending towards said second end of said support arm.

10. The hitch-mounted step of claim 1 wherein said step support platform having a length of approximately 20 inches and a width of approximately 15 inches.

11. The hitch-mounted step of claim 1 wherein said support arm coupling end of said coupling arm being substantially L-shaped.

12. The hitch-mounted step of claim 11 wherein said support arm coupling end extending approximately 4 inches vertically from said support arm.

13. The hitch-mounted step of claim 1 wherein said coupling arm having a width of approximately 2 inches and a height of approximately 2 inches.

14. The hitch-mounted step of claim 1 wherein said support arm having a width of approximately 1½ inch and a height of approximately 2 inches.

15. The hitch-mounted step of claim 1 wherein said coupling arm and said support arm and said step support platform being comprised of aluminum.

16. The hitch-mounted step of claim 1 further comprising a first locking pin dimensioned to be inserted through an aperture defined by said receiver mounting end of said coupling arm to lock said coupling arm to said hitch receiver of said vehicle.

17. The hitch-mounted step of claim 1 further comprising a second locking pin dimensioned to be inserted through an aperture defined by said support arm coupling end of said coupling arm and through an aperture defined by said support arm to lock said support arm in a substantially vertical position.

18. A method for accessing a rear cargo area of a vehicle comprising, in combination, the steps of:
- providing a coupling arm having a receiver mounting end and a support arm coupling end;
- inserting said receiver mounting end into a hitch receiver of a vehicle;
- providing a support arm having a first end and a second end, said first end of said support arm rotatably coupled to said support arm coupling end of said coupling arm so that said support arm being capable of rotating substantially vertically from said support arm coupling end of said coupling arm;
- providing a step support platform coupled to said support arm;
- deploying said step support platform by extending said support arm to a position substantially parallel to a ground surface so that said step support platform extends substantially entirely beyond a deployed tailgate of a vehicle;
- providing a stabilizing leg having a first end and a second end, said first end rotatably coupled to said support arm; and
- deploying said stabilizing leg by extending said stabilizing leg away from said support arm so that said second end of said stabilizing leg being dimensioned to contact a ground surface when said support arm being in a substantially horizontal position.

* * * * *